United States Patent [19]

Adam et al.

[11] Patent Number: 4,888,508

[45] Date of Patent: Dec. 19, 1989

[54] DEVICE AND PROCEDURE TO ADJUST THE AXIAL PLAY BETWEEN THE ROTOR AND THE STATOR MOUNTED BEARINGS OF AN ELECTRICAL MOTOR

[75] Inventors: Peter Adam, Hoechberg; Adolf Lindner, Rottendorf; Werner Schilling; Ewald Wehner, both of Wuerzburg, all of Fed. Rep. of Germany

[73] Assignee: Siemens Aktiengesellschaft, Berlin and Munich, Fed. Rep. of Germany

[21] Appl. No.: 779,727

[22] Filed: Sep. 24, 1985

[30] Foreign Application Priority Data

Sep. 24, 1984 [EP]  European Pat. Off. ........ 84111370.7

[51] Int. Cl.$^4$ ............................................ H02K 15/00
[52] U.S. Cl. ........................................ 310/42; 310/43; 310/90; 310/91; 310/261; 29/598
[58] Field of Search ................ 310/90, 261, 43, 45, 310/91, 42, 215, 217, 263, 264, 265, 270; 19/598

[56] References Cited

U.S. PATENT DOCUMENTS

| | | | |
|---|---|---|---|
| 2,483,013 | 9/1949 | Kopprasch | 310/90 |
| 3,726,575 | 4/1973 | Moorman | 310/90 X |
| 3,882,336 | 5/1975 | Boyd | 310/264 |
| 3,909,642 | 9/1975 | Busian | 310/90 X |
| 3,917,967 | 11/1975 | Robinson | 310/42 |
| 4,164,674 | 8/1979 | Buckman et al. | 310/90 |
| 4,431,317 | 2/1984 | Gradler | 310/90 X |
| 4,588,915 | 5/1986 | Gold | 310/91 |

FOREIGN PATENT DOCUMENTS 0065585 12/1982 European Pat. Off. .

Primary Examiner—R. Skudy
Attorney, Agent, or Firm—Volker R. Ulbrich

[57] ABSTRACT

This invention develops an automated procedure which permits the settling of the axial play of a rotor using a stator sleeve pressed onto the rotor shaft and held in place during assembly by an insulating end disc which mates at an end face with the laminated rotor core, whereby assuring the smallest number of assembly steps. According to this invention, the insulating end disc is injection-moulded in one piece along with the spacer sleeve with an intermediate weak rated point in the form of either elastic or break-away intermediate segments which permit a relative setting motion between the insulating end disc which contacts the end face of the laminated rotor core, and the spacer sleeve pressed on the rotor shaft. This invention is particularly suitable for small commutator motors with rotor shafts mounted in sleeve bearings.

4 Claims, 2 Drawing Sheets

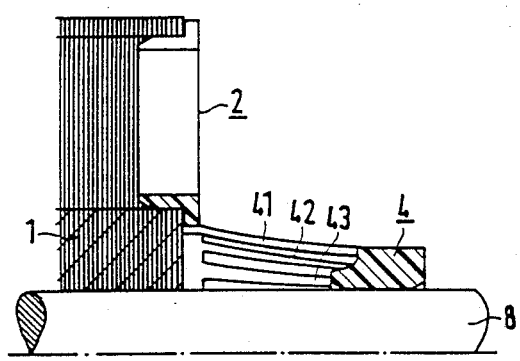
FIG 4
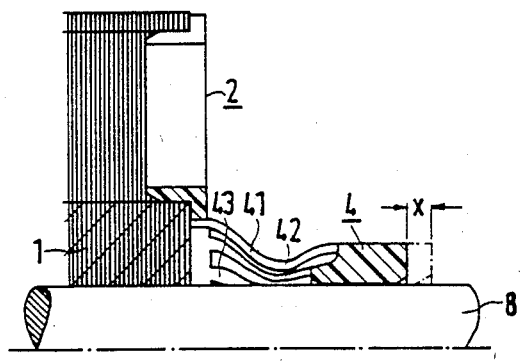
FIG 5
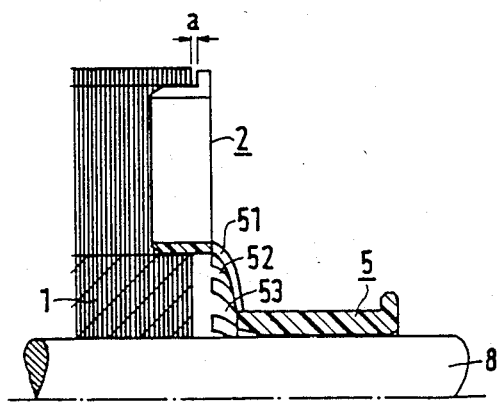

DEVICE AND PROCEDURE TO ADJUST THE AXIAL PLAY BETWEEN THE ROTOR AND THE STATOR MOUNTED BEARINGS OF AN ELECTRICAL MOTOR

BACKGROUND OF THE INVENTION

This invention relates to a device and procedure to adjust the axial play between the rotor and the bearings mounted within a stator housing of an electric motor.

A previous device and procedure to adjust the axial play between a rotor and stator mounted bearings is known from European Patent Office Patent No. 0,065,585 issued Dec. 1, 1982. In this previous device and procedure the spacer sleeve is fabricated as a separate component pressed into a shaft collar formed onto and projecting axially from an insulating end disc, i.e., locking plate, before being pressed onto the rotor shaft into a required corresponding cutout. By this pre-assembly of the spacer sleeve in the shaft collar of the insulating end disc, specifically a substantial simplification during motor assembly and adjustment of the axial play results. A further advantage realized is a compact, axial, structural length.

It is an object of this invention, while maintaining a simple assembly and adjustment of the axial play capabilities as well as the advantage of the compact, axial, structural length, to further simplify the fabrication of the assembly unit consisting of the spacer sleeve and the insulating end disc.

SUMMARY OF THE INVENTION

Briefly stated in accordance with one aspect of the invention, the aforementioned object is achieved by providing a device for adjusting the axial play between a rotor and stator housing mounted bearings of an electric motor, having a spacer sleeve, which is pressed onto a laminated rotor shaft of the motor and can be shifted by axial pressure before being pressed onto the rotor shaft during motor assembly. The device spacer sleeve is held in place by an insulating end disc for positioning on a first end of the laminated rotor core, wherein the insulating end disc along with the spacer sleeve are fabricated as one single injection-moulded piece with a weak rated, intermediate point permitting a relative setting motion between the insulating end disc, which mates against the first end of the laminated rotor core and the spacer sleeve.

By the uniting of the spacer sleeves and insulating end discs in accordance with the invention into a single injection-moulded plastic component, further fabrication steps can be saved in an advantageous fashion during automated fabrication. As the spacer sleeve simultaneously assumes the task of guiding the insulating end disc when pressed on a shaft, under given circumstances the axial length of the insulating end disc/spacer sleeve component can be further reduced whereby it could advantageously be used specifically for very small synchronous motors.

A particularly compact structural design of the arrangement in accordance with the invention is possible if designed in accordance with the embodiment having break away segments. Due to the breakaway segments the spacer sleeve can be telescoped within the shaft bore of the insulating end disc without thereby requiring a radial increase of the shaft bore and thus of the laminated rotor core. Simultaneously the spacer sleeve can be aligned for friction connection both at the rotor shaft as well as in the shaft bore at the insulating end disc.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

FIG. 3 shows a frontal plan view of the insulating end disc with form-fit spacer sleeve in according to FIG. 2;

FIG. 4 illustrates in a partial longitudinal section through the permanent-magnet commutator motor a further model of an insulating end disc with a spacer sleeve connected in one piece via elastic intermediate segments in stretched position of the intermediate segments;

FIG. 5 shows a design according to FIG. 2 after adjusting the axial play and correspondingly radially bent intermediate segments; and FIG. 6 illustrates a further embodiment of the invention in a partial longitudinal section through a permanent-magnetic commutator motor with an insulating end disc and a spacer sleeve connected by hinge-type elastic intermediate segments.

DESCRIPTION OF A PREFERRED EMBODIMENT

Figure 1:
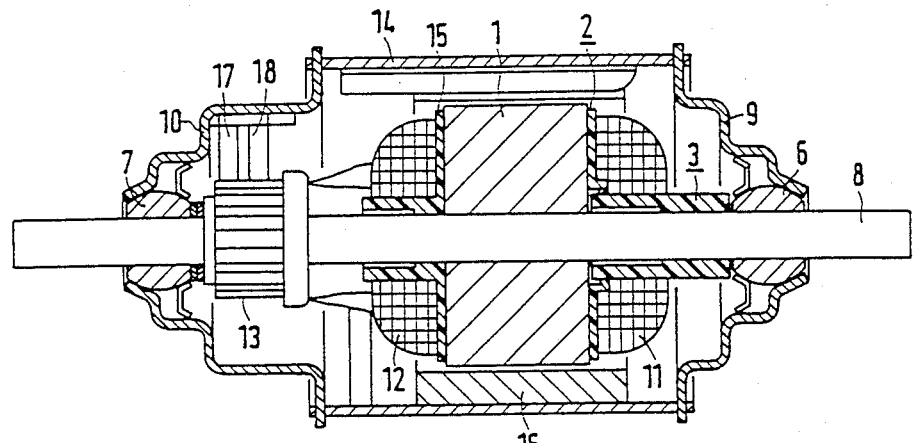
FIG. 1 illustrates a longitudinal section through a permanent-magnet commutator motor after the intermediate segments have been removed.

FIG. 1 shows a permanent-magnet commutator motor. Along the internal circumference of stator housing 14 permanent magnets 16 generating the magnetic field are installed. Bearing brackets 9, 10 are fastened at the ends of the stator housing 14. Bearing brackets 9, 10 mesh with the partly spherically-shaped bearings 6, 7 in which a rotor shaft 8 is mounted in a rotating fashion. A laminated rotor core 1, e.g., in a press-fit seating, is held in place on rotor shaft 8. At the left shaft end of rotor shaft 8, a commutator 13 is affixed, inside the stator housing 14. Hammer brush holders 17, 18 are mounted in a manner not shown in detail in the illustration, i.e., in a brush-holder yoke inserted into the stator housing and connected to an external line. The winding ends of the wound rotor winding are connected to the bars of commutator 13, with the reference symbols 11, 12 being assigned in FIG. 1 to the rotor end windings.

For electrical insulation of end windings 11, 12 toward the outer ends of laminated rotor core 1 and toward the ends of rotor shaft 8, plastic insulating end discs 2, 15 are included, each with an axially formed shaft collar which at least in the area of the winding ends overlaps rotor shaft 8. In the case of the right insulating end disc 2 the shaft collar of the insulating end disc 2 is formed by spacer sleeve 3 which along with insulating end disc 2 is fabricated as a single injection-moulded part. The design of the insulating end disc 2 and the single-piece moulded-on spacer sleeve 3 is more clearly shown in detail in the sectional views in accordance with FIGS. 2 and 3.

Figure 2:
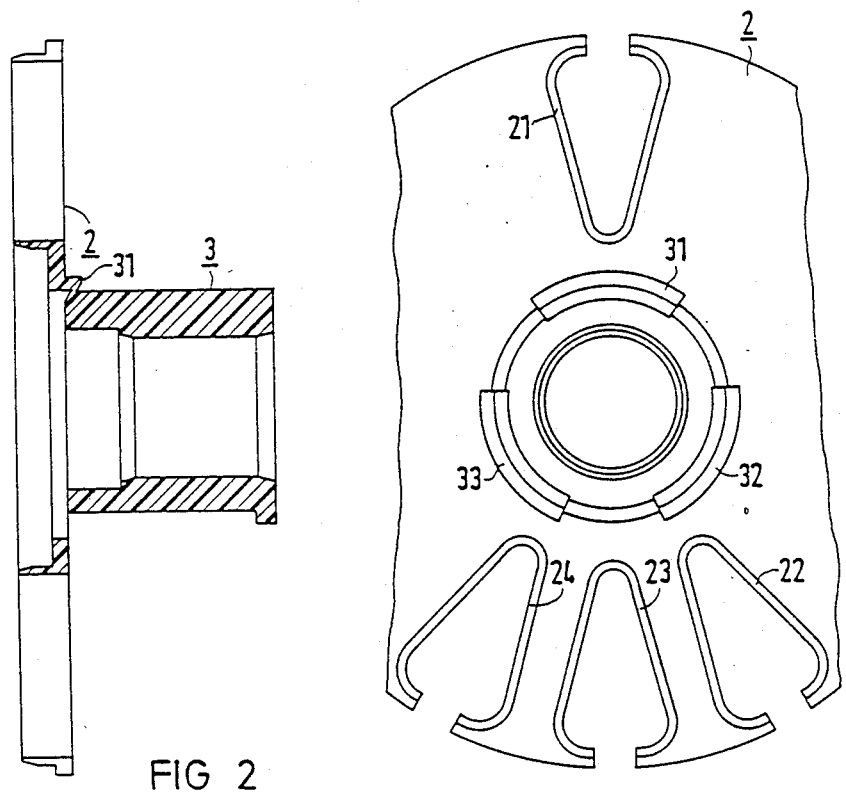
FIG. 2 shows an enlarged detailed section of the right insulating end disc shown in FIG. 1 with spacer sleeve connected in one piece via the not yet broken away intermediate segments.

FIG. 2 shows the single-piece injection-moulded component comprising the insulating end disc 2 and spacer sleeve 3 prior to adjustment of the axial play. Spacer sleeve 3 is connected by molding at its left end by three intermediate segments 31, 32, 33 distributed around the circumference to the insulating end disc 2. When sliding the insulator end disc up to the stop against the right end of laminated rotor core 2, spacer sleeve 3 provides alignment assistance while at the same time providing guide support on rotor shaft 8. FIG. 3 also indicates keyway linings 21 through 24 shaped in the insulating end discs, which mesh in the keyways by a slight axial dimension.

The adjustment of spacer sleeve 3 to assure a certain axial play between the rotor and the bearings of the stator housing takes places most advantageously after winding the laminated rotor core 1, wherein the insulating end sleeve 2 is further secured at its end face position on the laminated rotor core 1 by the winding path. When pressing the insulating end disc 2 with the single-piece moulded-on spacer sleeve 3 which has an outside diameter smaller than the inside diameter of disc 2, a tool presses on the spacer sleeve 3 and at the same time holds the external end face of insulator end disc 2 in place. Adjustment of the axial play can best be done after inserting the wound rotor in the right bearing bracket while mounting the second left bearing bracket, wherein by the axial pressure exerted the laminated rotor core with the insulating end disc 2 positioned on its end face can be shifted relative to spacer sleeve 3 once the intermediate segments 31 through 33 have been separated by the axial pressure. By the required fit the design advantageously incorporates that when inserting the left end of spacer sleeve 3 in the shaft bore of insulating end disc 2, the external circumference of spacer sleeve 3 is frictionally engaged along the inner circumference of the shaft bore of insulating end disc 2.

FIGS. 4, 5 show a further embodiment of an arrangement according to the invention to adjust the axial play, wherein a spacer sleeve 4 is connected by elastic intermediate segments distributed around the circumference, of which three intermediate segments 41 through 43 are depicted in FIG. 4. FIG. 5 shows the position of the spacer sleeve 4 relative to insulating end disc 2 after the spacer sleeve 4 press-fit on rotor shaft 8 has been moved leftward by a fitting dimension "x" towards laminated rotor core 1 to establish a certain axial play; thereby the intermediate segments 41, 43 bend radially inwards.

FIG. 6 shows a further embodiment of the design in accordance with the invention, wherein a spacer sleeve 5 with the insulating end disc 2 similarly press-fit on rotor shaft 8 is connected by elastic intermediate segments contour-fitting around the circumference in a hinge-like fashion, with three intermediate segments 51 through 53 being shown in this view. The insulating end disc 2 is herein only slid onto rotor shaft 8 until a slight axial space to the end face of laminated rotor core 1 remains. Upon subsequent winding the laminated rotor core 1, the insulating end disc 2, due to the winding path against the end face of laminated rotor core 1, is tightened and thus "tips", due to the hinge-type connection, by a slight angle in contrast to the unchanged positioning of spacer sleeve 5. Said spacer sleeve is only subsequently slid towards laminated rotor core 1 for axial play adjustment, as already described for the embodiments according to FIGS. 4, 5, thereby reducing axial play "a"; the maximum bridgeable tolerances which have to be taken into account when setting the axial play can thus be advantageously expanded by the space as defined by one embodiment of this invention.

It will now be understood that there has been disclosed an improved device and procedure for adjusting the axial play between the rotor and the stator mounted bearings of an electric motor. As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. A unitary component for use in electrical motors of the type in which the rotor shaft supports a rotor core and is supported by bearings mounted on the stator housing, comprising;
    an insulated end disk dimensioned for attachment to the rotor core;
    a spacer sleeve dimensioned to press-fit onto the rotor shaft; and
    a break-away region connecting the disk and the sleeve in such a manner that the sleeve moves towards the disk when the region is broken by axially directed pressure applied to the sleeve;
    and the disk, sleeve and region being a unitary molded part.

2. The component of claim 1, wherein the disk has a central circular opening for receiving the shaft and wherein the outside surface of the sleeve is friction-fit inside the opening when the region is broken.

3. The component of claim 1, wherein the break-away region comprises a plurality of like arcuate intermediate segments which extend circumferentially around the shaft between the sleeve and the disk.

4. The component of claim 1, wherein the disk has a central circular opening for receiving the shaft and wherein the outside diameter of the sleeve is smaller than the inside diameter of the opening.

* * * * *